A. A. SHEETS.
Horse-Power Equalizer.
No. 164,224. Patented June 8, 1875.
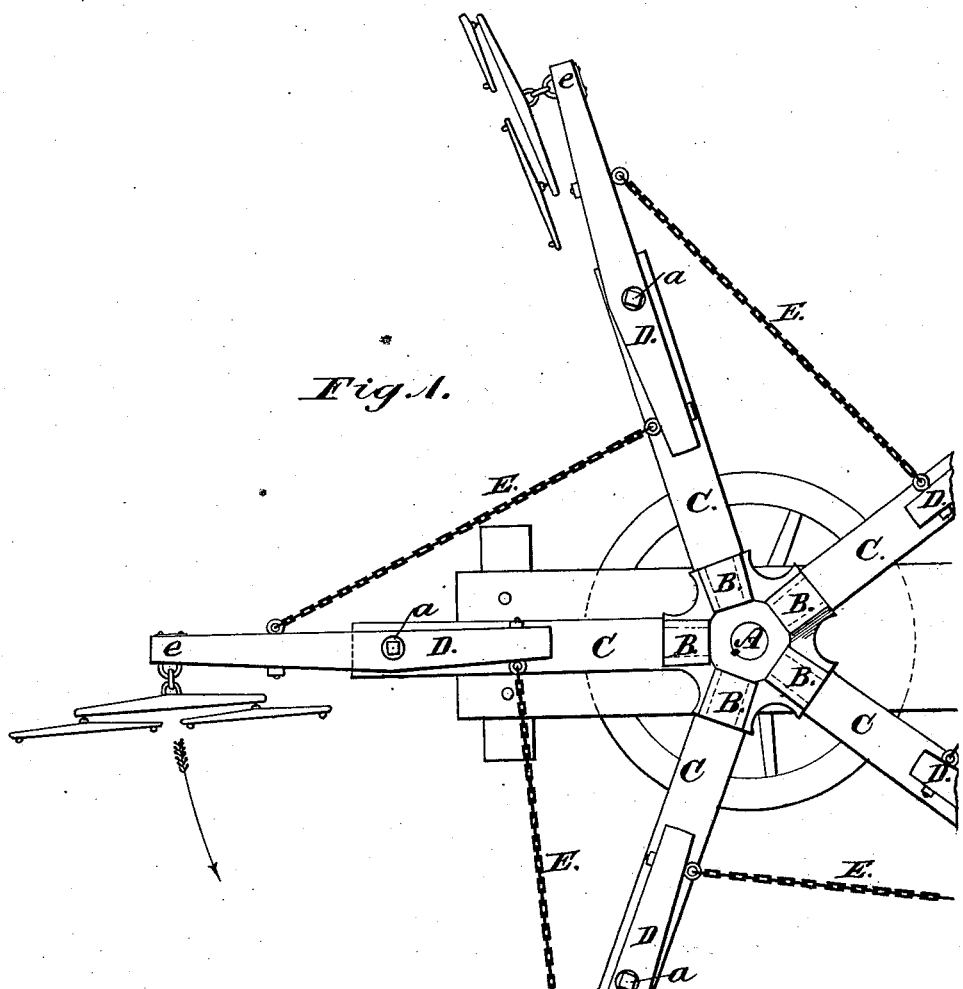
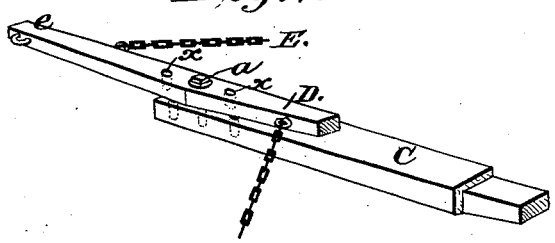
Witnesses.
H. L. Perine
S. Parks
Inventor.
Albert A. Sheets
Per C. M. Parks
Atty.

UNITED STATES PATENT OFFICE.

ALBERT A. SHEETS, OF MAUMEE CITY, OHIO.

IMPROVEMENT IN HORSE-POWER EQUALIZERS.

Specification forming part of Letters Patent No. 164,224, dated June 8, 1875; application filed May 19, 1875.

*To all whom it may concern:*

Be it known that I, ALBERT A. SHEETS, of Maumee City, Lucas county, Ohio, have invented an Improvement in Horse-Power Equalizers; and I do hereby declare the following to be a full and correct description of the same, reference being had to the accompanying drawings, in which—

Figure 1 represents a top view of my invention, and Fig. 2 a detailed perspective view of a part.

My invention relates to an improvement in horse-powers, by which the draft of the horses is equalized, and the motive power exerted upon the machinery kept regular and uniform; and it consists in connecting the horses to the sweeps through the medium of levers pivoted to the upper, or, if preferable, the under, side of said sweeps by swivel-joints, and connecting the inner end of each lever to the outer end of the one in advance of it, by which means the surplus power exerted by any of the horses is lost upon the other horses, instead of being communicated to the machinery, and making the motion irregular and uneven.

In the drawings, A represents the driving-shaft or spindle of any horse-power; and B B, &c., the sockets for the reception of the sweeps C C, &c. Upon the top or bottom of the sweeps C are pivoted, by means of a bolt, *a*, or otherwise, a lever, D, to the outer end of which the horses are attached, as may be seen at *e*. To the inner end of said lever D is attached, by means of an eye or otherwise, the end of the chain E, which connects the inner end of any lever D to the lever immediately in advance of it, at a point a proper distance beyond the bolt *a*. The inner end of each lever D is therefore secured to the outer end of the lever in advance of it, and the outer end of each lever D is secured to the inner end of the lever in the rear of it, so that power applied to any lever will draw the outer ends of the levers, both in front and rear of it, in an opposite direction.

The effect of this construction is that the power applied by each horse to the ends of the levers D will be exerted directly upon the driving-shaft A so long as each horse is doing his proportion of the work; but as soon as any exerts himself unduly, instead of jerking the shaft A, the force, by means of the chains E, loses itself against the horses in front and the rear, leaving the motion of the driving-shaft regular and even.

It can also readily be perceived that by adjusting the bolt *a* in the lever D either forward or backward, an advantage may be given to any horse upon the longer arm of the lever.

Several different adjustments may be made by means of holes, as at *x x*, Fig. 2; but these I do not claim; but Having described my invention, what I do claim as new, and desire to secure by Letters Patent, is—

The levers D D, &c., pivoted upon the top or bottom of the sweeps of a horse-power, and connected together by chains, in the manner and for the purpose shown and described.

The above specification of my said invention signed and witnessed at Maumee, Ohio, this 10th day of September, A. D. 1873.

A. A. SHEETS.

Witnesses:
 A. J. TAYLOR,
 CLARA J. HOLT.